(12) United States Patent
Allen

(10) Patent No.: US 11,616,349 B2
(45) Date of Patent: Mar. 28, 2023

(54) COMMUNICATIONS CABLE WITH FABRIC SLEEVE

(71) Applicant: WESCO Distribution, Inc., Pittsburgh, PA (US)

(72) Inventor: Jerry L. Allen, Sarasota, FL (US)

(73) Assignee: WESCO Distribution, Inc, Pittsburgh, PA (US)

( * ) Notice: Subject to any disclaimer, the term of this patent is extended or adjusted under 35 U.S.C. 154(b) by 7 days.

(21) Appl. No.: 16/839,362

(22) Filed: Apr. 3, 2020

(65) Prior Publication Data

US 2020/0235554 A1 Jul. 23, 2020

Related U.S. Application Data

(63) Continuation of application No. 14/712,101, filed on May 14, 2015, now Pat. No. 10,862,280, which is a continuation of application No. 12/455,356, filed on Jun. 2, 2009, now Pat. No. 9,054,507.

(60) Provisional application No. 61/132,698, filed on Jun. 23, 2008.

(51) Int. Cl.
- *H02G 1/08* (2006.01)
- *H02G 9/06* (2006.01)
- *H02G 3/04* (2006.01)
- *H01B 7/18* (2006.01)
- *G02B 6/44* (2006.01)

(52) U.S. Cl.
CPC ............. *H02G 1/08* (2013.01); *H01B 7/1805* (2013.01); *H02G 3/0481* (2013.01); *H02G 9/065* (2013.01); *G02B 6/4459* (2013.01); *Y10T 29/49117* (2015.01)

(58) Field of Classification Search
CPC ...... H02G 1/08; H02G 3/0481; H02G 3/0468; H02G 3/0487; H01B 7/2825; H01B 7/1885; H01B 7/1805; G02B 6/4422; G02B 6/4488; G02B 6/4459; G02B 6/4464

See application file for complete search history.

(56) References Cited

U.S. PATENT DOCUMENTS

| | | | | |
|---|---|---|---|---|
| 4,791,236 A | * | 12/1988 | Klein | D04B 1/14 138/166 |
| 6,398,190 B1 | * | 6/2002 | Li | G02B 6/4459 254/134.3 FT |
| 2002/0170728 A1 | * | 11/2002 | Holland | B65D 63/00 174/19 |
| 2004/0081411 A1 | * | 4/2004 | Gladfelter | F16L 3/26 385/100 |
| 2012/0186121 A1 | * | 7/2012 | Hanssen | A44C 5/0053 40/633 |
| 2014/0174585 A1 | * | 6/2014 | Itoh | D03D 15/283 139/384 R |

* cited by examiner

*Primary Examiner* — Seahee Hong
(74) *Attorney, Agent, or Firm* — Renner, Kenner, Greive, Bobak, Taylor & Weber

(57) ABSTRACT

A communications cable (11) is provided with a pliant sleeve (12, 21, 31) to allow it to be more easily inserted into a conduit. One form of the sleeve (12) has hook (14) and loop (15) connected to each other so that the sleeve (12) can engage the cable (11). Another form of the sleeve (21) is spring-loaded to engage the cable (11). In a third form of the sleeve (31) has an adhesive (33) which attaches the sleeve (31) to the cable (11).

5 Claims, 2 Drawing Sheets

COMMUNICATIONS CABLE WITH FABRIC SLEEVE

CROSS-REFERENCE TO RELATED APPLICATION

This application is a continuation of U.S. patent application Ser. No. 14/712,101 filed on May 14, 2015, which was a continuation of U.S. patent application Ser. No. 12/455,356 filed on Jun. 2, 2004 (now U.S. Pat. No. 9,054,507) which claimed priority of U.S. Provisional Application No. 61/132,698 filed Jun. 23, 2008, all of which are incorporated herein by reference.

TECHNICAL FIELD

This invention relates to a communications cable which is provided with a fabric sleeve installed on the cable at the factory or in the field just before the cable is installed into a conduit. Such a sleeve makes it easier to install cables into a conduit already having a cable therein without damage to either cable.

BACKGROUND ART

Positioning cables in underground communication conduits which extend for several thousand feet has long been a problem. Such is particularly true when it is desired to position an additional cable or cables into a conduit that already has a cable in it. That cable, particularly because of its plastic jacket, provides a great deal of friction to the new cable as it is attempted to be inserted into the conduit. As a result, the new or the existing cable may be easily damaged due to that friction. Such is particularly true when the cable in the conduit is undulating which causes the cable being introduced to take a sinuous, fraction-laden path.

An extremely successful solution to this problem is a fabric innerduct sold under the trademark MAXCELL® by TVC Communications, LLC and shown in U.S. Pat. No. 6,262,371 which is incorporated by reference for whatever details may be necessary to understand the present invention. This innerduct is first positioned in a conduit and divides the conduit into longitudinally extending compartments. When a cable is positioned in one of the compartments, a pull tape or rope that is in another compartment is utilized to pull a second cable into that compartment. Because there is fabric between the cables, the friction is not on the cable jacket but on the fabric which makes installation easier.

However, a problem can exist when using these innerducts in small diameter conduits which extend long distances. In these small conduits, the fabric innerduct takes up much of the space in the conduit and the tape or rope may tend in lock up in the innerduct thereby impeding the ability to pull in a cable.

As a result, the need exists for a more efficient manner in which to install a cable into a conduit, particularly a small diameter conduit.

DISCLOSURE OF THE INVENTION

It is thus an object of one aspect of the present invention to provide a cable with a pliant sleeve.

It is an object of another aspect of the present invention to provide a cable and sleeve assembly which is easy to insert both into an empty conduit or into an innerduct within the conduit.

It is an object of an additional aspect of the present invention to provide a method of forming a cable with a pliant sleeve and introducing the cable and sleeve assembly into a conduit.

These and other objects of the present invention, as well as the advantages thereof over existing prior art forms, which will become apparent from the description to follow, are accomplished by the improvements hereinafter described and claimed.

In general, an apparatus to be introduced into a conduit made in accordance with the present invention includes a cable having a length and a pliant sleeve positioned around the cable for substantially the entire length.

The present invention also relates to a method of introducing a longitudinally extending cable into a conduit which includes the steps of wrapping a pliant material around substantially the entire length of the cable and thereafter introducing the wrapped cable into the conduit.

Preferred exemplary cable and sleeve assemblies according to the concepts of the present invention are shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 4:
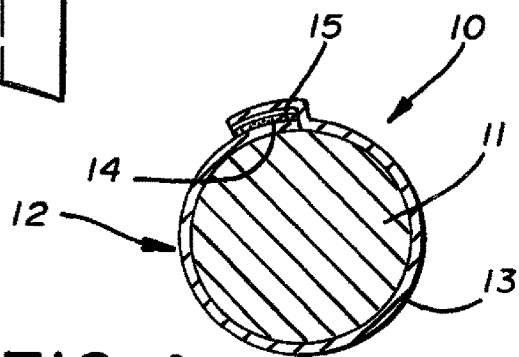
FIG. 4 is a sectional view of a cable and sleeve of the present invention showing the sleeve of FIGS. 2 and 3 wrapped around the cable.

One form of a cable and sleeve assembly made in accordance with the present invention is indicated generally by the numeral 10 and includes a communications cable 11 and a sleeve generally indicated by the numeral 12. Cable 11 is a conventional item and, as such, typically includes a plurality of conductive wires encapsulated within a plastic jacket. Sleeve 12 may be made of a pliant material such as the fabric described in U.S. Pat. No. 6,421,485, and can be in the form of a longitudinally extending sheet 13 of material having a fastening system formed on opposed edges thereof. Such a system could be glue or some other adhesive, or it could be the VELCRO® hook and loop fastening system shown. Thus, one edge on one side of sheet 13 may be provided with a hook connector 14 and the opposed edge on the other side of sheet 13 may be provided with the companion loop connector 15. The width of the sheet between the connectors 14 and 15 generally corresponds to the circumference of cable 11 such that when sleeve 12 is positioned on cable 11, as shown in FIG. 4, connectors 14 and 15 may engage each other to tightly hold sleeve 12 on cable 11.

Figure 7:
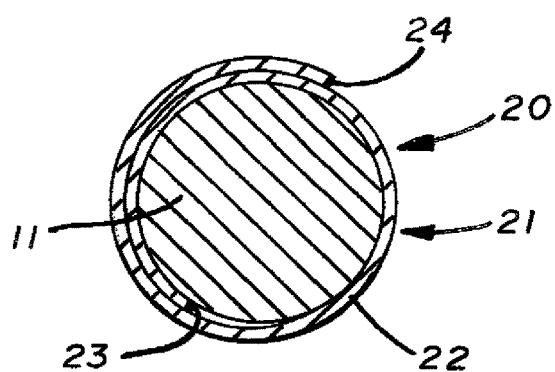
FIG. 7 is a sectional view of a cable and sleeve of the present invention showing the sleeve of FIGS. 5 and 6 wrapped around the cable.

An alternative cable and sleeve assembly is shown in FIG. 7 and generally indicated by the numeral 20. There, the conventional cable 11 is shown as receiving a spring-loaded sleeve of fabric or thin plastic material generally indicated by the numeral 21 which is formed of a sheet 22 having opposed edges 23 and 24. As shown, edge 24 circumferentially overlaps a portion of sheet 22 to provide a tight grip on cable 11.

Figure 8:
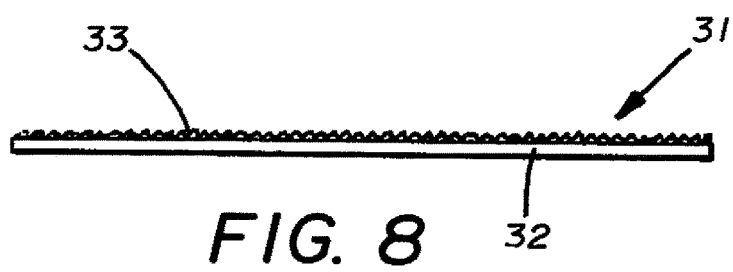
FIG. 8 is an end view of another alternative version of a fabric sleeve made in accordance with the present invention.
Figure 9:
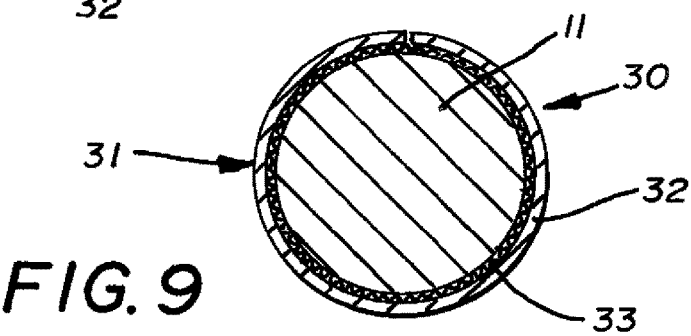
FIG. 9 is a sectional view of a cable and a sleeve of FIG. 8 wrapped around the cable.

Another alternative cable and sleeve assembly is shown in FIG. 9 and generally indicated by the numeral 30. There, the conventional cable 11 is shown as receiving a fabric sleeve generally indicated by the numeral 31. Like sleeve 12, sleeve 31 may be formed of a pliant or fabric material and provided in the form of a longitudinally extending sheet 32. As best shown in FIG. 8, one side of sheet 32 can be provided with an adhesive 33. The width of sheet 32 generally corresponds to the circumference of cable 11 such that when sheet 32 is placed on cable 11 with its adhesive 33 side facing the plastic jacket of cable 11, sheet 32 firmly engages the plastic jacket of cable 11 as shown in FIG. 9.

The cable sleeve assemblies 10, 20, or 30 may be manufactured and assembled at the factory and shipped on rolls to the underground conduit construction site. Typically, such rolls could have two thousand or more feet of assemblies 10, 20, or 30 thereon to be played out and inserted into an underground conduit by conventional systems.

Figure 1:
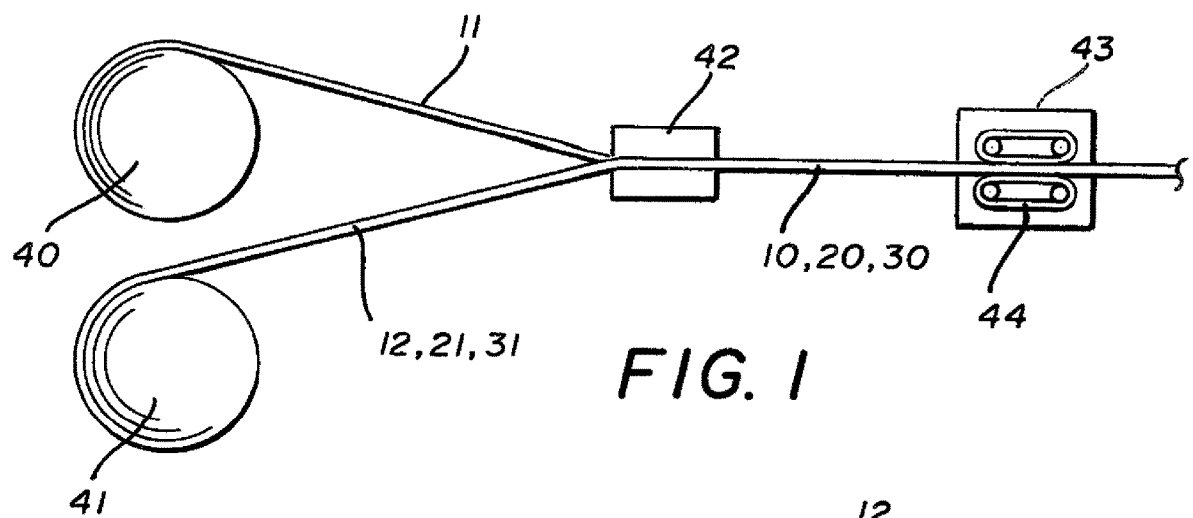
FIG. 1 is a schematic view showing the manner in which a conventional cable is wrapped with a fabric sleeve and inserted in to conduit.
Figure 2:
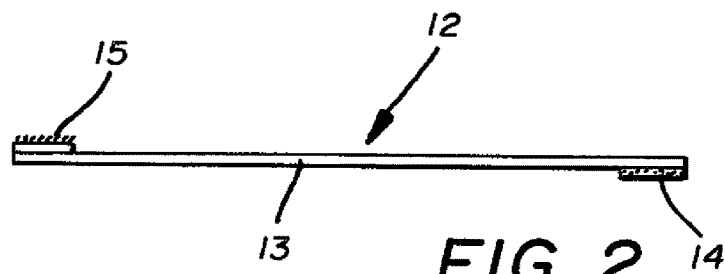
FIG. 2 is an end view of a fabric sleeve made in accordance with the present invention.
Figure 3:
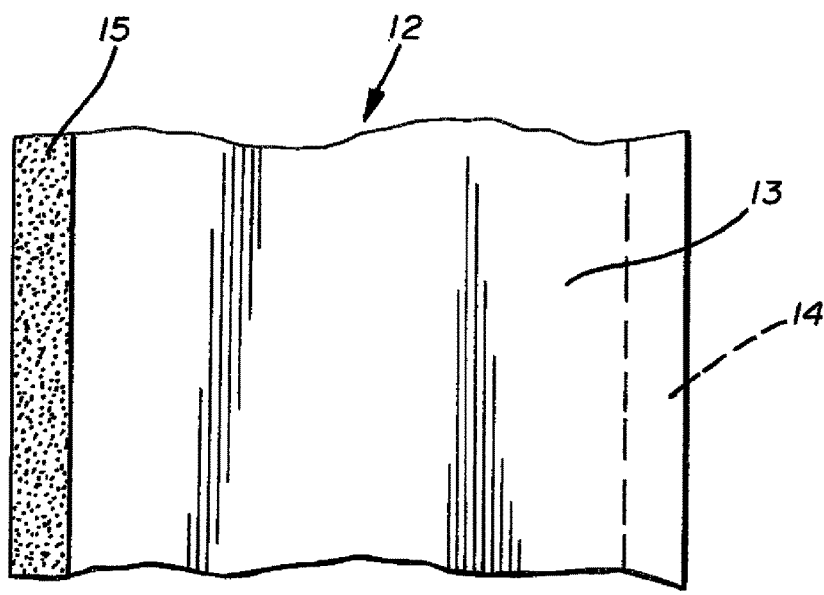
FIG. 3 is a fragmentary top plan view of the sleeve of FIG. 2.
Figure 5:
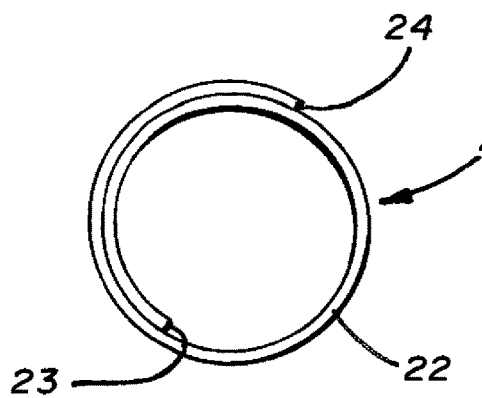
FIG. 5 is an end view of an alternative version of a fabric sleeve made in accordance with the present invention.
Figure 6:
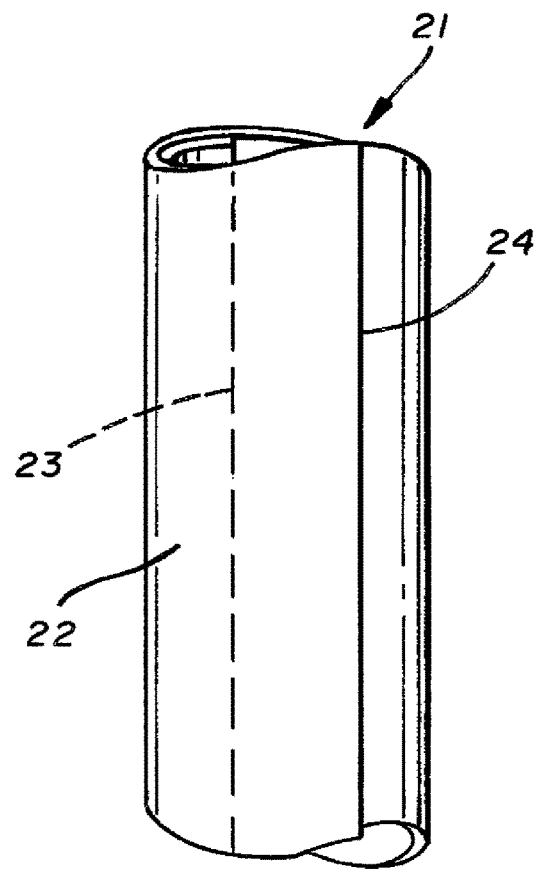
FIG. 6 is a fragmentary top plan view of the sleeve of FIG. 5.

Alternatively, a sleeve 12 or 21 could be applied to the cable 11 in the field as schematically shown in FIG. 1. In this instance, a roll 40 of cable 11 and a roll 41 of a sleeve 12 or 21 are provided at the site for installation into a conduit. The cable 11 and sleeve 12 in the condition shown in FIG. 2, 3 or 8 or the sleeve 21 in the condition shown in FIGS. 5 and 6, are fed to a device 43. In the instance of operation with a sleeve 12 or 31, device 43 is a folder which wraps sleeve 12 or 31 around cable 11 as they simultaneously pass through device 42 to form assembly 10. In the instance of operation with a sleeve 21, device 42 can be a spreader which opens sleeve 21 so that the cable 11 may pass between edges 23 and 24. The spreader then releases sleeve 21 to allow sleeve 21 to snap back to its original condition and now forming assembly 20. The resulting cable and sleeve assembly 10, 20 or 30 may then be pulled into a conduit by a conventional rope or pull tape or may be provided to a conventional cable pushing/blowing machine 43 which includes tractor-like devices 44 to grip assembly 10 or 20 and push it into and through a conduit (not shown) to the right in FIG. 1. The pushing movement of devices 44 can be assisted by the blowing of air into the conduit as is known in the art.

By wrapping a cable with a pliable material which has less friction than the jacket of a cable, assemblies 10, 20 or 30 can be more easily installed into a conduit which does not have an innerduct therein. As a result, the cost of the innerduct is saved. On the other hand, if the conduit does have an innerduct already positioned therein, the cable sleeve assemblies 10, 20 or 30 are also more easily inserted into a compartment of the innerduct.

As a result, a cable sleeve assembly 10, 20 or 30 manufactured and used as described herein accomplishes the objects of the invention and otherwise substantially improves the art.

What is claimed is:

1. A device to be inserted into a longitudinally extending underground conduit comprising a cable, a longitudinally extending sheet of material having a coefficient of friction less than that of the cable and having a width that generally corresponds to the circumference of the cable, and a single bonding member extending longitudinally along each edge of said sheet, said bonding members being attached to each other such that said sheet is wrapped around said cable with the only overlap of the sheet being at the bonding members and without said sheet being attached to said cable, and an entire circumferential surface of said cable being in contact with said sheet.

2. The device of claim 1 wherein said sheet is made of a pliant material.

3. The device of claim 2 wherein said sheet is made of a fabric material.

4. A device to be inserted into a longitudinally extending underground conduit comprising a cable, a longitudinally extending planar sheet of material having opposed surfaces, having a coefficient of friction less than that of the cable, and having a width that generally corresponds to the circumference of the cable, and a single bonding member extending longitudinally along each edge of said sheet, said sheet being wrapped around said cable and said bonding members being attached to each other such that said sheet is wrapped around said cable with the only overlap of the sheet being at the bonding members and without said sheet being attached to said cable, wherein said bonding member on one edge of the edges of said sheet is only on one surface of the opposed surfaces of said sheet, and said bonding member on the other edge of the edges of said sheet is only on the other surface of the opposed surfaces of said sheet opposite to said one surface, and an entire circumferential surface of said cable being in contact with said sheet.

5. The device of claim 4 wherein said bonding member on said one edge is a hook member and said bonding member on said other edge is a loop member.

* * * * *